United States Patent [19]

Hiiragizawa et al.

[11] Patent Number: 5,377,347
[45] Date of Patent: Dec. 27, 1994

[54] DATA PROCESSOR FOR GENERATING PULSE SIGNAL IN RESPONSE TO EXTERNAL CLOCK INCLUDING FLIPFLOP

[75] Inventors: Yasunori Hiiragizawa; Masahiro Nomura, both of Tokyo, Japan

[73] Assignee: NEC Corporation, Tokyo, Japan

[21] Appl. No.: 676,715

[22] Filed: Mar. 28, 1991

[30] Foreign Application Priority Data

Mar. 28, 1990 [JP] Japan .................... 2-79214

[51] Int. Cl.⁵ .................... G06F 1/04; G06F 1/24
[52] U.S. Cl. .................... 395/550; 395/800; 364/270; 364/DIG. 1; 327/172
[58] Field of Search ............... 395/800, 550, 575, 500; 364/431.05; 307/265-270

[56] References Cited

U.S. PATENT DOCUMENTS

| | | | |
|---|---|---|---|
| 4,257,108 | 3/1981 | Igel | 307/269 |
| 4,258,300 | 3/1981 | Fromont | 388/814 |
| 4,550,307 | 10/1985 | Akashi et al. | 340/347 DA |
| 4,996,474 | 2/1991 | Tambe et al. | 324/78 D |
| 5,126,944 | 6/1992 | Sakuma et al. | 364/431.05 |
| 5,146,601 | 9/1992 | Hosaka et al. | 395/800 |

*Primary Examiner*—Alyssa H. Bowler
*Assistant Examiner*—Alpesh M. Shah
*Attorney, Agent, or Firm*—Whitham, Curtis, Whitham & McGinn

[57] ABSTRACT

A pulse generator includes an event counter receiving an external clock for counting the external clock, a first compare register coupled to the event counter for generating a first equal signal when a count value of the event counter becomes equal to a value set in the first compare register. The first equal signal is supplied to the event counter so as to clear the event counter. A free-running counter receives an internal clock for counting the internal clock, and a second compare register is coupled to the free-running counter for generating a second equal signal when a count value of the free-running counter becomes equal to a value set in the second compare register. A first flipflop is set by the first equal signal and reset by a write signal for the second compare register, and a second flipflop is set by the first equal signal, and reset by the second equal signal when the tint flipflop is in a reset condition, so as to generate an external pulse signal, so that even if the second equal signal is generated, the external pulse signal is never reset unless the first flipflop has been reset.

8 Claims, 7 Drawing Sheets

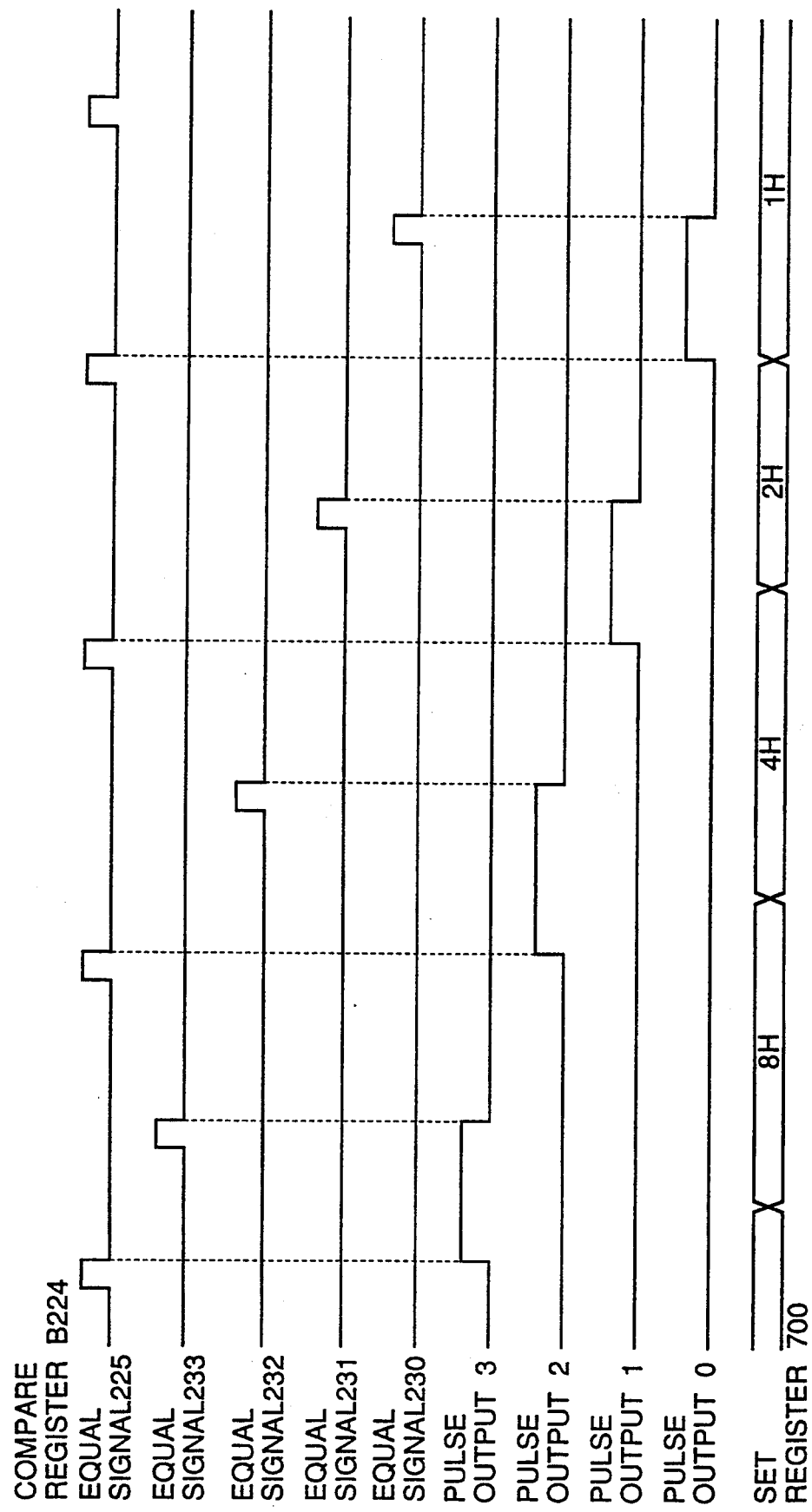

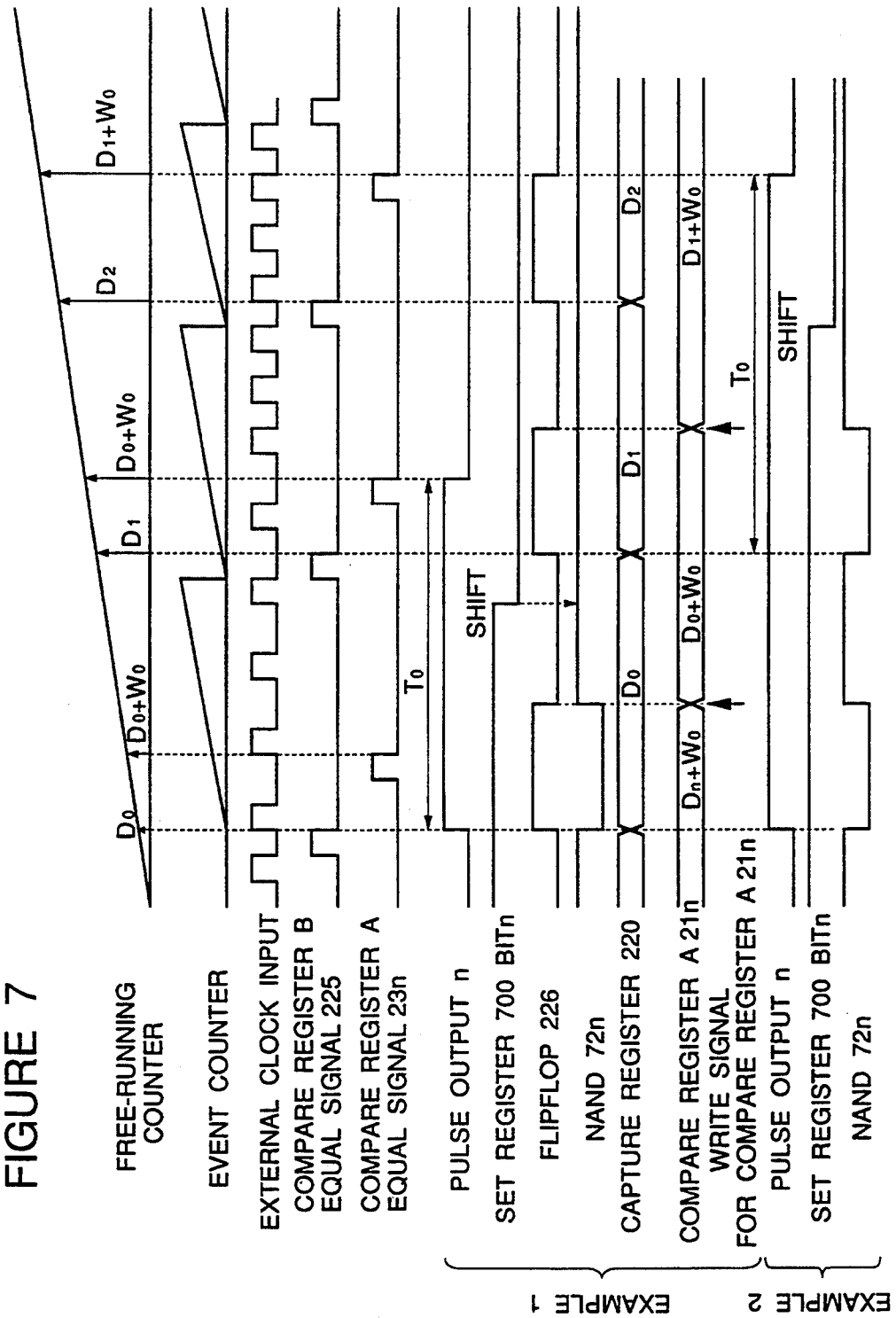

DATA PROCESSOR FOR GENERATING PULSE SIGNAL IN RESPONSE TO EXTERNAL CLOCK INCLUDING FLIPFLOP

BACKGROUND OF THE INVENTION

1. Field of the Invention

The present invention relates to a data processor, and more specifically to a data processor functioning as a pulse generator which receives a clock from a peripheral equipment and generates a pulse for controlling the peripheral equipment.

2. Description of Related Art

A pulse generator realized by a data processor and receiving a clock from a peripheral equipment for generating a pulse controlling the peripheral equipment has been widely used for various real-time peripheral equipment controls, for example automobile engine controls.

A pulse generator realized by a data processor basically comprises a central processing unit, an interrupt controller for generating an interrupt request to the central processing unit, and a peripheral device for generating an interrupt signal to the interrupt controller. The peripheral device includes a free-running counter for counting an internal clock, and a compare register for comparing a .count value of the free-running counter with a value set in the compare register itself. The peripheral device also includes an event counter for counting an external clock, and another compare register for comparing a count value of the event counter with a value set in the compare register itself. A flipflop is set when the second compare register detects coincidence, and reset when the first compare register detects coincidence, so that the flipflop generates a pulse signal having a desired predetermined pulse width in synchronism with the external clock.

However, the conventional pulse generator has been disadvantageous in the following point: If the repetition period of the external clocks becomes short to the extent that the repetition period of equal signals generated by the compare register coupled to the event counter becomes shorter than the desired predetermined pulse width of the pulse signal to be generated by the flipflop, the pulse signal is reset although the pulse signal should be maintained at a high level. For example, if the pulse generator is used for a fuel injection control of an automobile engine, when fuel should be continued to be injected, the pulse signal is suddenly reset so that the fuel injection is suddenly stopped.

SUMMARY OF THE INVENTION

Accordingly, it is an object of the present invention to provide a pulse generator which has overcome the above mentioned defect of the conventional one.

Another object of the present invention is to provide a pulse generator capable of generating a pulse signal having a desired predetermined pulse width even if the repetition period of the external clocks becomes short.

The above and other objects of the present invention are achieved in accordance with the present invention by a data processor including a central processing unit, an interrupt controller for asynchronously outputting an interrupt request to the central processing unit, and a peripheral device, the central processing unit, the interrupt controller and the peripheral device being coupled to each other through a bus. The peripheral device includes an event counter receiving an external clock for counting the external clock, and a first compare register coupled to the event counter for generating a first equal signal when a count value of the event counter becomes equal to a value set in the first compare register. The first equal signal is supplied to the event counter so as to clear the event counter. A free-running counter receives an internal clock for counting the internal clock, and a second compare register is coupled to the free-running counter for generating a second equal signal when a count value of the free-running counter becomes equal to a value set in the second compare register. A first flipflop is set by the first equal signal and reset by a write signal for the second compare register, and a second flipflop is set by the first equal signal, and reset by the second equal signal when the first flipflop is in a reset condition, so as to generate an external pulse signal, so that even if the second equal signal is generated, the external pulse signal is never reset unless the first flipflop has been reset.

The above and other objects, features and advantages of the present invention will be apparent from the following description of preferred embodiments of the invention with reference to the accompanying drawings.

BRIEF DESCRIPTION OF THE DRAWINGS

FIG. 6 is a timing chart illustrating sequential output pulses generated in the device shown in FIG. 5; and FIG. 7 is a timing chaff illustrating an operation of the device shown in FIG. 5.

DESCRIPTION OF THE PREFERRED EMBODIMENTS

Figure 1:
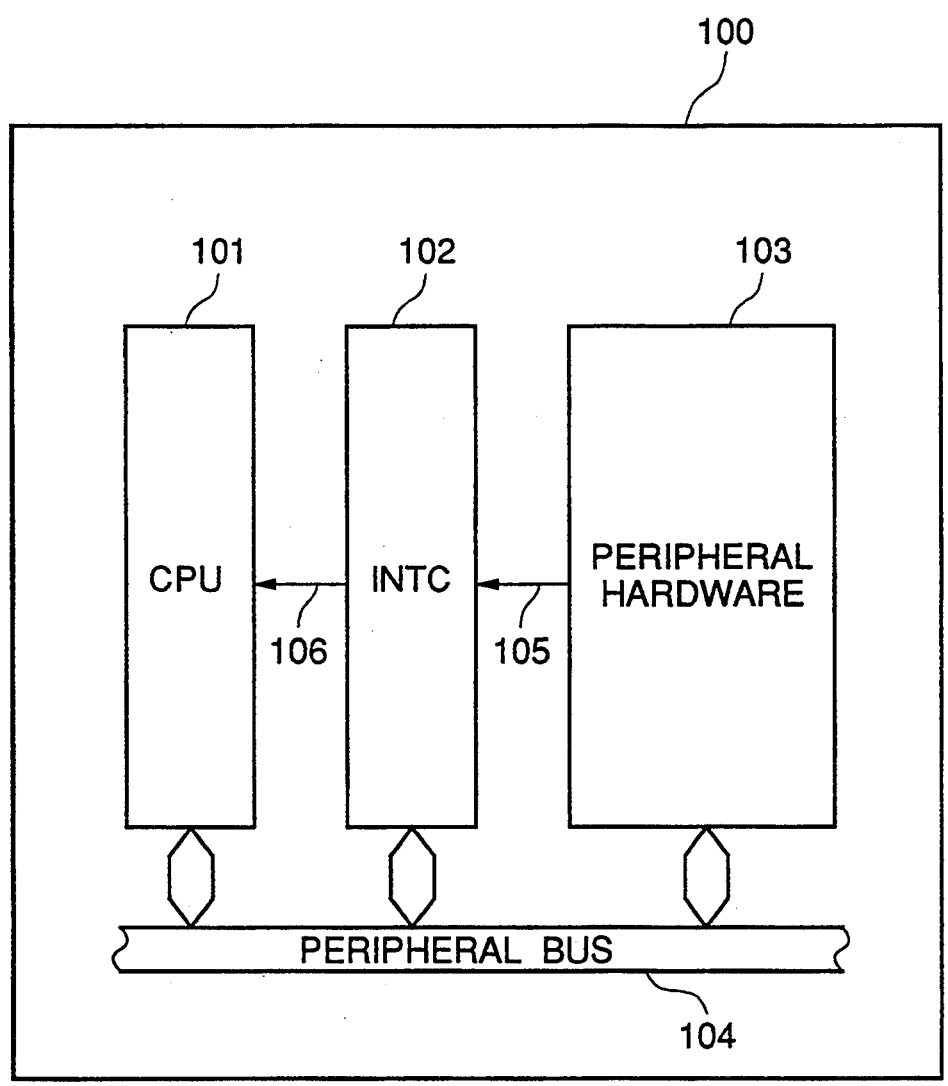
FIG. 1 is a block diagram of an overall structure of the data processor in accordance with the present invention capable of functioning as a pulse generator.

Referring to FIG. 1, there is shown a block diagram of an overall structure of the data processor in accordance with the present invention capable of functioning as a pulse generator.

The shown pulse generator 100 realized by a data processor basically comprises an central processing unit (CPU) 101, an interrupt controller (INTC) 102, and a peripheral device 103, which are coupled to a peripheral bus 104.

The peripheral device 103 generates an interrupt signal 105 to the interrupt controller 102. When the interrupt controller 102 receives the interrupt signal 105, the interrupt controller 102 discriminates a priority level of the received interrupt signal 105, and outputs an interrupt request 106 to the central processing unit 101, if necessary. If the central processing unit 101 receives the interrupt request 106, the central processing unit 101 executes a predetermined interrupt processing on the basis of a program previously stored in an internal or external memory.

Figure 2:
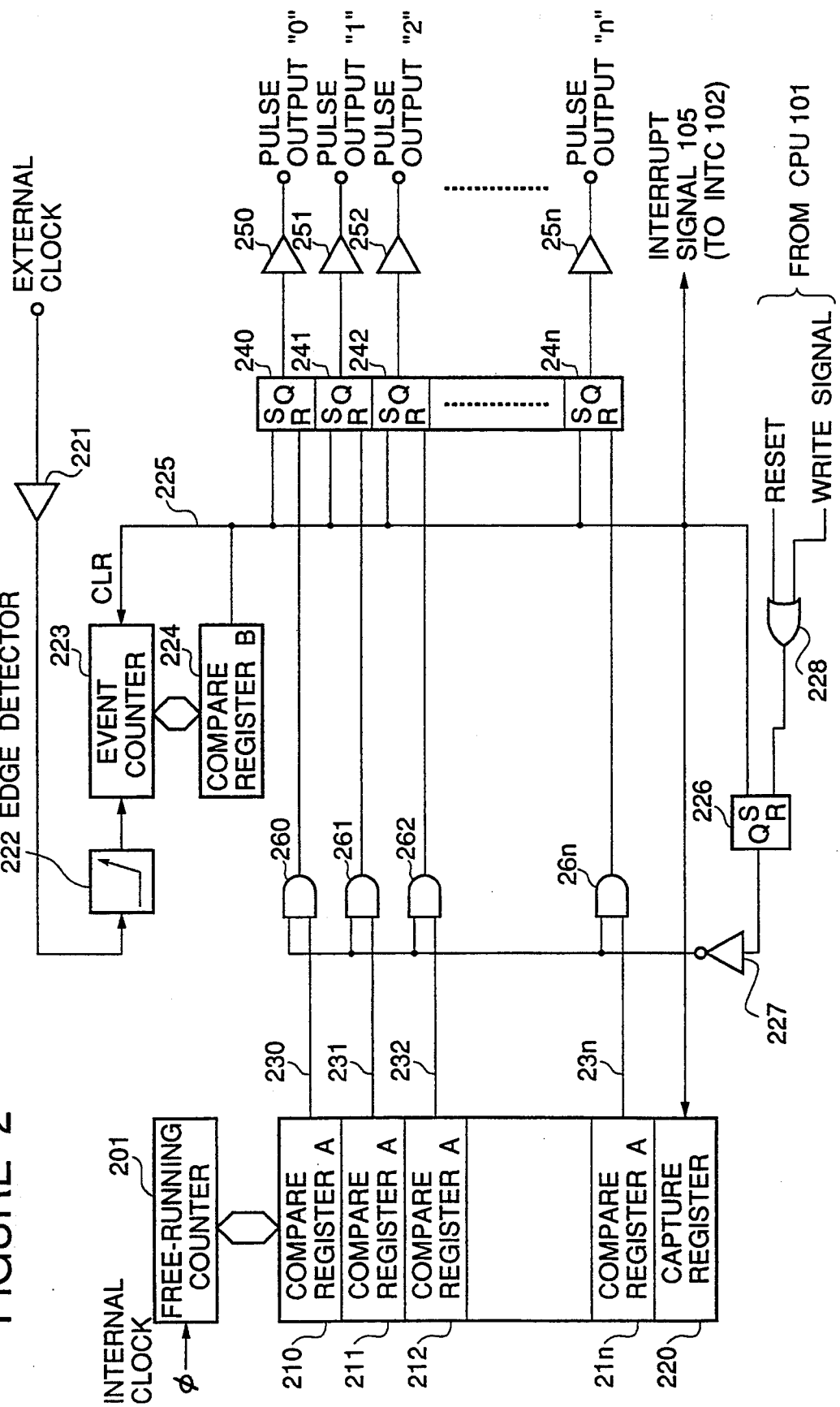
FIG. 2 is a block diagram of a first embodiment of the peripheral device included in the data processor shown in FIG. 1.

Referring to FIG. 2, there is shown a block diagram illustrating an internal structure of the peripheral device 103 included in the data processor shown in FIG. 1. The peripheral device 103 includes a free-running counter 201 for counting an internal count clock $\phi$, a plurality of compare registers A 210 to 21n each for comparing a count value of the free-running counter 201 with a value set in the compare register itself, and a capture register 220 for capturing the count value of the free-running counter 201. The peripheral device also includes an input buffer 221 receiving an external clock signal, an edge detector 222 coupled to an output of the input buffer 221 for detecting an edge of the external clock supplied through the input buffer 211, an event counter 223 for counting the external clock detected by the edge detector 222, and a compare register B 224 for comparing a count value of the event counter with a value set in the compare register itself and for generating an equal signal 225 when the count value of the event counter 223 becomes equal to the value set in the compare register 224.

The equal signal 225 is supplied to a set input S of a flipflop 226, which is in turn reset through an OR gate 228 by either a write signal for the first compare registers A 210 to 21n or a reset signal RESET both from the CPU 101. A Q output of the flipflop 226 is supplied through an inverter 227 to one input of each of AND gates 260 to 26n provided in correspondence to the first compare registers A 210 to 21n. These AND gates 260 to 26n receive, at their other input, equal signals 230 to 23n respectively generated by the first compare registers A 210 to 21n.

The equal signal 223 is supplied to a set input S of each of flipflops 240 to 24n respectively provided in correspondence to the first compare registers A 210 to 21n. Reset inputs R of these flipflops 240 to 24n are connected to outputs of the AND gates 260 to 26n, respectively. Outputs of the flipflops 240 to 24n are connected to output buffers 230 to 25n, respectively, for outputting pulse output signals PULSE OUTPUT "0" to PULSE OUTPUT "n".

Furthermore, the equal signal 225 is supplied to the event counter 223 so as to clear the event counter 223, and also applied to the capture register 220 as a capture trigger signal. In addition, the equal signal 225 is outputted to the interrupt controller 102 as the interrupt signal 105.

In addition, the compare registers A 210 to 21n and B 224 are written by the CPU 101 in a programmed manner.

Now, an operation of the circuit shown in FIG. 2 will be described with reference to FIG. 3 which is a timing chart illustrating an operation of the device shown in FIG. 2, and by means of the example of the pulse output signal PULSE OUTPUT "0" outputted from the output buffer 250.

The event counter 223 counts the external clock signal. When the event counter 223 reaches the value previously set in the compare register B 223, the compare register B 224 generates the equal signal 225. In response to the equal signal 225, the flipflop 240 is set so as to bring the pulse output signal PULSE OUTPUT "0" into a high level "1". At the same time, the flipflop 226 is also set so that the output signal of the inverter 227 is brought to a low level "0". Therefore, the outputs of all the AND gates 260 to 26n are fixed to the low level "0". As a result, it is inhibited to reset the flipflops 240 to 24n by the equal signals 230 to 23n.

The equal signal 225 is also applied to the capture register 220 as the capture trigger signal, so that a count value $D_0$ of the free-running counter 201 is fetched in the capture register 220. Furthermore, the equal signal 225 is also applied to the event counter 223 as the clear signal, and outputted to the interrupt controller 102 as the interrupt signal 105.

When the interrupt controller 102 receives the interrupt signal 105, the interrupt controller 102 discriminates a priority level of the received interrupt signal 105, and outputs the interrupt request 106 to the central processing unit 101.

On the other hand, if the central processing unit 101 receives the interrupt request 106, the central processing unit 101 executes a predetermined interrupt processing on the basis of the previously stored program. In this case, the central processing unit 101 executes a processing to the effect that a sum of the value $D_0$ held in the capture register 220 and a count value $W_0$ of the free-running counter 201 corresponding to a desired output pulse width $T_0$, namely, $(D_0+W_0)$ is written to the compare register A 210.

Here, assuming that the internal count clock has a frequency "$\phi$", a relation of $T_0 = W_0/\phi$ holds.

In response to a write signal for the compare register A 210, the flipflop 226 is reset so as to allow the flipflops 240 to 24n to be reset by the corresponding equal signals 230 to 23n, respectively, when the equal signals 230 to 23n are generated.

The free-running counter 201 continues to count up in response to each internal clock $\phi$, and when the count value of the free-running counter 210 reaches the value $(D_0+W_0)$, the compare register A 210 outputs the equal signal 230. The flipflop 240 is reset by this equal signal 230, so that the pulse output signal PULSE OUTPUT "0" is brought into the low level "0".

On the other hand, the event counter 223 continues to count up in response to each external clock. When the count value of the event counter 223 becomes equal to the value set in the compare register B 224, again, the equal signal 225 is generated by the compare register B 224, again, so that the flipflop 240 and the flipflop 226 are set, again. As a result, the pulse output signal PULSE OUTPUT "0" is brought into the high level "1", again. At the same time, it is inhibited to reset the flipflops 240 to 24n by the equal signals 230 to 23n, again.

Figure 3:
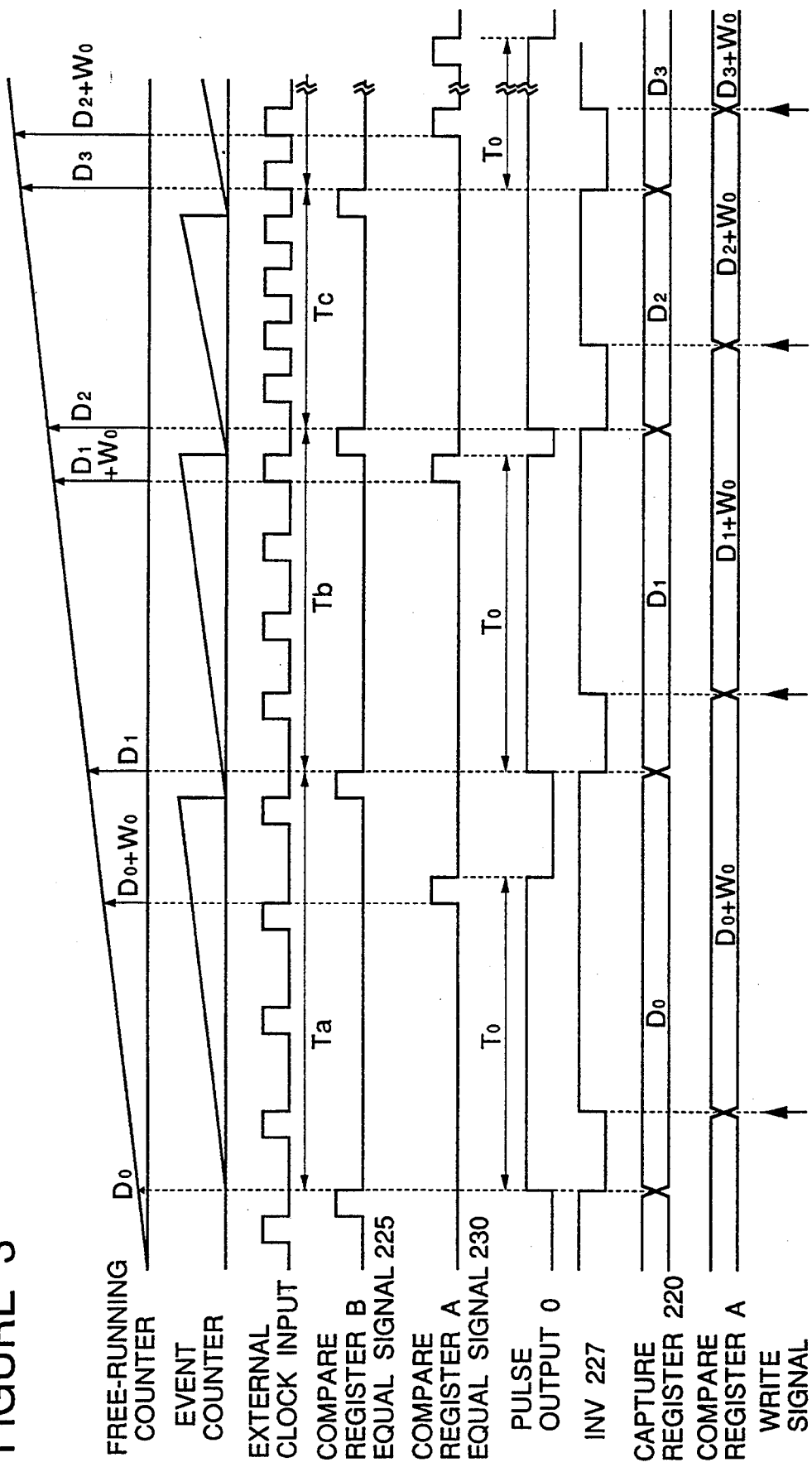
FIG. 3 is a timing chart illustrating an operation of the device shown in FIG. 2.

Thereafter, the above mentioned operation is repeated as long as a generation period of the equal signal 225 is longer than the desired output pulse width $T_0$, as in periods Ta and Tb shown in FIG. 3. Namely, the output pulse signal having the desired output pulse width $T_0$ can be obtained in synchronism with the external clock signal.

If the generation period of the equal signal 225 is shorter than the desired output pulse width $T_0$, as in a period Tc shown in FIG. 3, the circuit operates as follows:

In response to the equal signal 225, the flipflop 240 is set so as to bring the pulse output signal PULSE OUTPUT "0" into the high level "1", and the flipflop 226 is also set so as to cause the inverter 227 to generate the output of the low level "0". In response to the interrupt signal 105 given by the equal signal 225, the central processing unit 101 updates the compare register A 210 so as to write $(D_2+W_0)$ to the compare register A 210. With a write signal for writing $(D_2+W_0)$, the flipflop 226 is reset so that the inverter 227 outputs the signal of the high level "1" so as to allow the flip flops 240 to 24n to be reset by the equal signals 230 to 23n when the equal signals 230 to 23n are generated.

However, the equal signal 225 is generated again before the equal signal 230 is generated by the compare register A 210, as shown in FIG. 3. Therefore, the flipflop 226 is set again so as to cause the inverter 227 to generate the output of the low level "0" so as to inhibit the flipflops 240 to 24n to be reset by the equal signals 230 to 23n. As a result, when the count value of the free-running counter 201 becomes equal to $(D_2+W_0)$ held in the compare register A 210 and the compare register A 210 generates the equal signal 230, the flipflop 240 will not be reset, so that the flipflop 240 maintains the high level "1" of the pulse output signal PULSE OUTPUT "0".

Thus, even if the period of the external clock becomes short to the extent that the generation period of the equal signal 225 is shorter than the desired output pulse width $T_0$, the pulse output signals PULSE OUTPUT "0" to PULSE OUTPUT "n" will never be suddenly reset.

Figure 4:
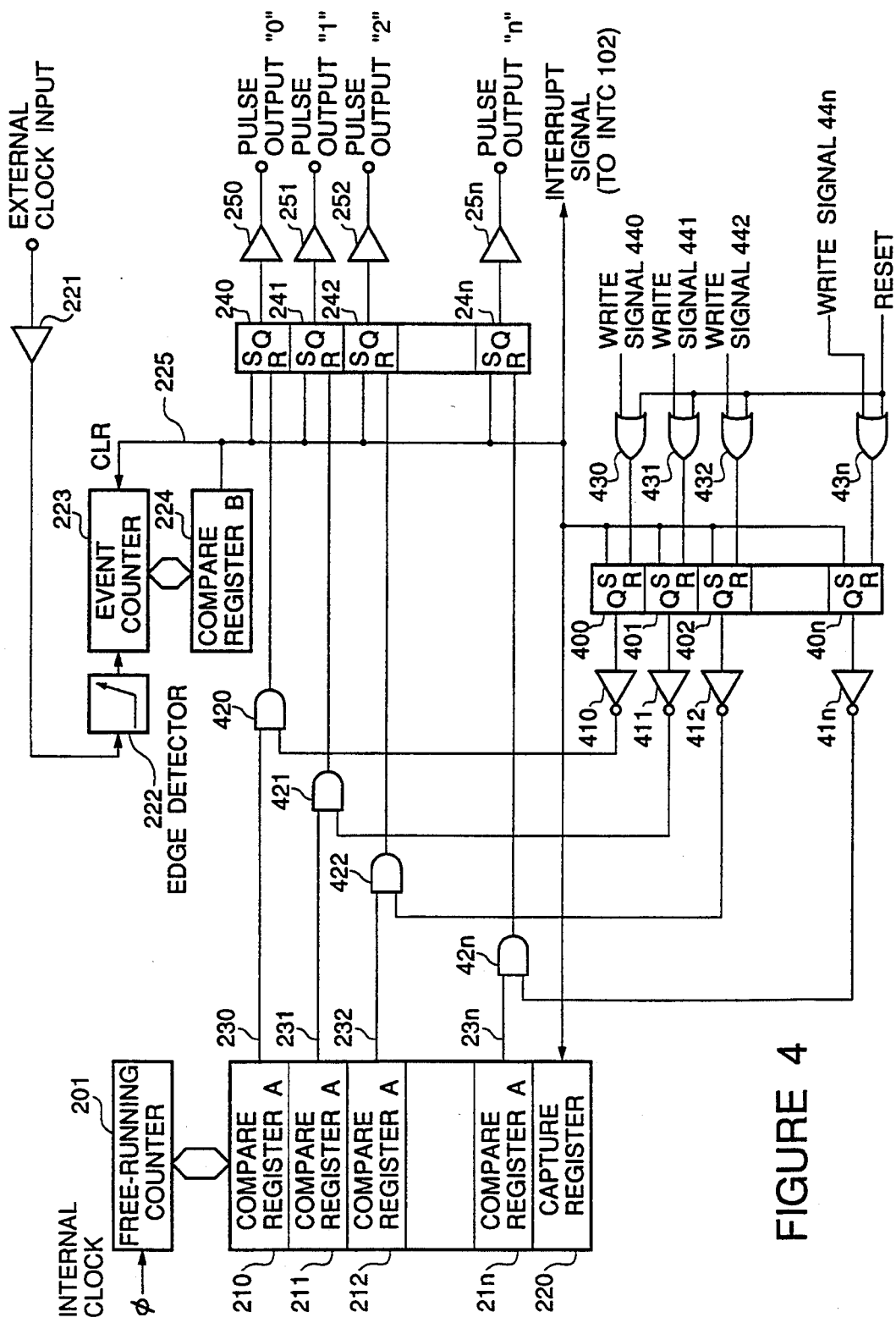
FIG. 4 is a block diagram of a second embodiment of the peripheral device included in the data processor shown in FIG. 1.

Turning to FIG. 4, there is shown a modification of the circuit shown in FIG. 2. Therefore, in FIG. 4, elements similar to those shown in FIG. 2 are given the same Reference Numerals, and explanation thereof will be omitted.

As seen from comparison between FIGS. 2 and 4, the embodiment shown in FIG. 4 does not comprise the flipflop 226, the inverter 227 and the AND gates 260 to 26n of the first embodiment. The embodiment shown in FIG. 4 substitutionally comprises flipflops 400 to 40n set by the equal signal 225 and individually reset through OR gates 430 to 43n by respective write signals 440 to 44n for the compare registers A 210 to 21n., inverters 410 to 41n connected to outputs of the flipflops 400 to 40n, respectively, and AND gates 420 to 42n each receiving the corresponding equal signal (230 to 23n) and the output of the corresponding inverter (410 to 41n) and having an output connected to the reset input R of the corresponding flipflop (240 to 24n).

In the first embodiment, if any one of the compare registers A 210 to 21n is updated, the flipflops 240 to 24n are allowed to be reset by the equal signals 230 to 23n, respectively. However, the second embodiment shown in FIG. 3 is configured so that it is not allowed to reset the flipflops 240 to 24n and hence the pulse output signals PULSE OUTPUT "0" to PULSE OUTPUT "n", unless the corresponding compare register is updated or rewritten. Therefore, it is possible to elaborately control a plurality of pulse output signals PULSE OUTPUT "0" to PULSE OUTPUT "n" in a wide control range.

Figure 5:
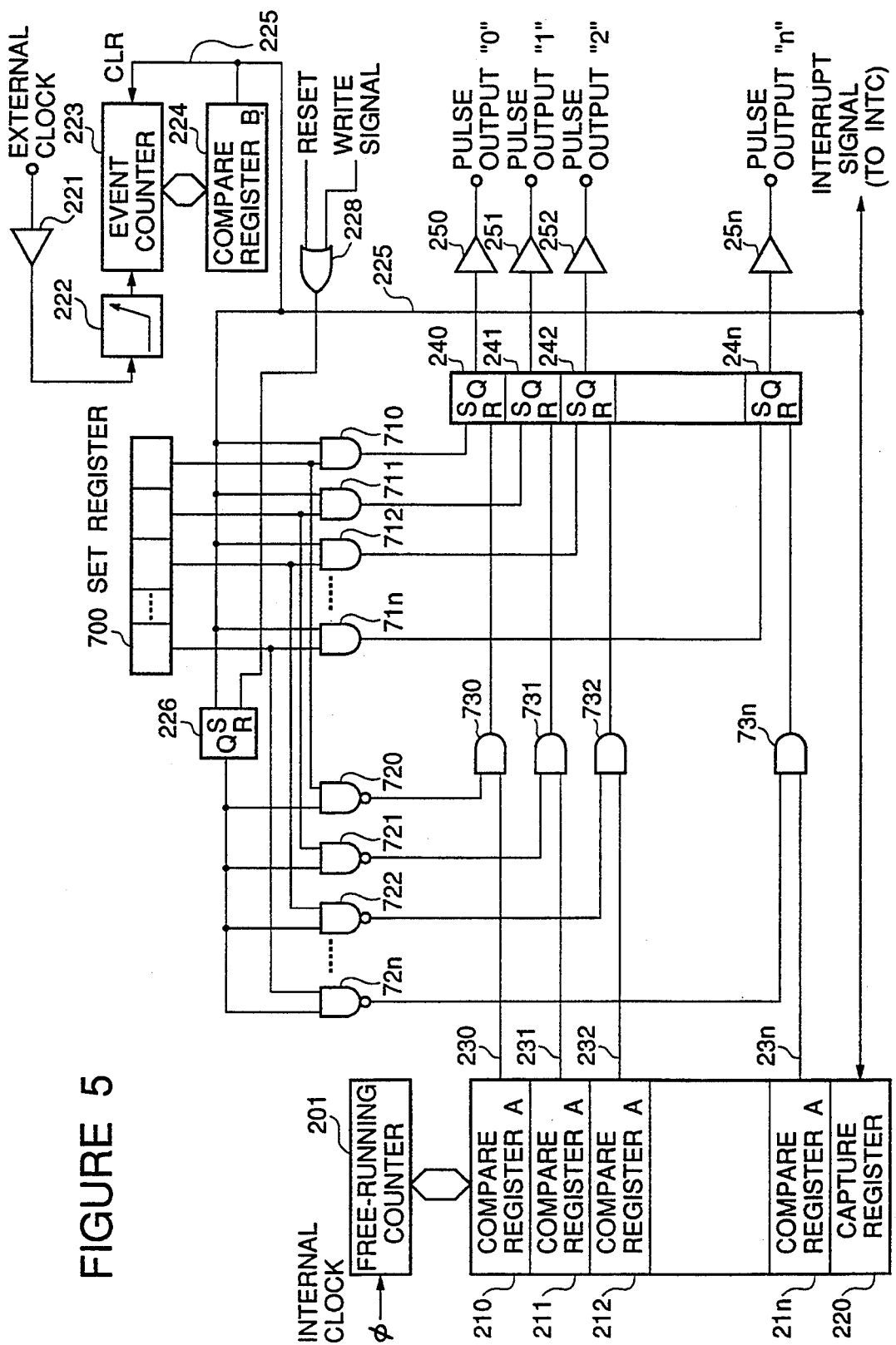
FIG. 5 is a block diagram of a third embodiment of the peripheral device included in the data processor shown in FIG. 1.

Referring to FIG. 5, there is shown a third embodiment of the peripheral device shown in FIG. 1. Therefore, in FIG. 5, elements similar to those shown in FIG. 2 are given the same Reference Numerals, and explanation thereof will be omitted.

As seen from comparison between FIGS. 2 and 5, the third embodiment additionally includes a set register 700, AND gates 710 to 71n, NAND gates 720 to 72n and AND gates 730 to 73n provided in place of the AND gates 260 to 26n.

The third embodiment can sequentially generate a plurality of pulse output signals PULSE OUTPUT as shown in FIG. 6.

Bits of the set register 700 correspond to the pulse output signals PULSE OUTPUT "0" to PULSE OUTPUT "n", respectively. Each bit of the set register 700 is connected to one input of a corresponding AND gate C710 to 71n). The other input of each of the AND gates 710 to 71n is commonly connected to receive the equal signal 225. An output of each of the AND gates 710 to 71n is connected to the set input S of the corresponding flipflop (240 to 24n).

When the equal signal 225 is generated by the compare register B 224, one flipflop or flipflops of the flipflops 240 to 24n selected by a set bit or bits of the set register 700 through the AND gates 710 to 71n are set, so that a pulse output signal or signals PULSE OUTPUT corresponding to the set bit or bits of of the set register 700 are set. At this time, a pulse output signal or signals PULSE OUTPUT corresponding to a not-set bit or bits of the set register 700 are not set. Accordingly, it is possible to selectively set any one or ones of the pulse output signals PULSE OUTPUT "0" to PULSE OUTPUT "n", by selecting any one or ones of the flipflops 240 to 24n through the AND gates 710 to 71n by means of the set register 700.

Therefore, if a (n)th bit of the set register 700 is set and the set register 700 is controlled in such a manner that the content of the set register 700 is rightward and cyclicly shifted at each time that the equal signal 225 is generated, sequential pulse output signals can be obtained as shown in FIG. 6. FIG. 6 shows the case of "n"=4 for simplification, namely, the case that the set register 700 is formed of 4 bits.

If the content of the set register 700 is not shifted, the pulse output signal or signals PULSE OUTPUT corresponding to the set bit or bits of of the set register 700 are generated similarly to the first embodiment.

Now, a sequential pulse output operation of the third embodiment will be described with reference to FIG. 7.

First, the (n)th bit of the set register 700 is set. The event counter 223 counts up in response to each external clock signal. When the value of the event counter 223 becomes equal to the value previously set in the compare register B 223, the compare register B 224 generates the equal signal 225. In response to the equal signal 225, the output of the AND gate 71n is brought to the high level "1" so that the flipflop 24n is set so as to bring the pulse output signal PULSE OUTPUT "n" into a high level "1". At the same time, the flipflop 226 is also set so that the output of the NAND gate 72n is brought to a low level "0". Therefore, the output of the AND gate 73n is fixed to the low level "0". As a result, even if the equal signal 23n is generated at this time (namely, even if the content of the free-running counter 201 becomes $D_n+W_0$), the flipflop 24n is never reset, On the other hand, since the (0)th bit to the (n−1)th bits of the set register 700 are "0", the outputs of the NAND gates 720 to 72(n−1) are "1", and therefore, the AND gate 730 to 73(n−1) are open so that the flipflops 240 to 24(n−1) can be reset by the equal signals 230 to 23(n−1), respectively when these equal signals 230 to 23(n−1) are generated.

The equal signal 225 is also applied to the capture register 220 as the capture trigger signal, so that a count value $D_0$ of the free-running counter 201 is fetched in the capture register 220. Furthermore, the equal signal 225 is also applied to the event counter 223 as the clear signal, and outputted to the interrupt controller 102 as the interrupt signal 105.

When the interrupt controller 102 receives the interrupt signal 105, the interrupt controller 102 discriminates a priority level of the received interrupt signal 105, and outputs the interrupt request 106 to the central processing unit 101.

On the other hand, when the central processing unit 101 receives the interrupt request 106, the central processing unit 101 executes a predetermined interrupt processing on the basis of the previously stored program. In this case, the central processing unit 101 executes a processing to the effect that a sum of the value $D_0$ held in the capture register 220 and a count value $W_0$ of the free-running counter 201 corresponding to a desired output pulse width $T_0$, namely, $(D_0+W_0)$ is written to the compare register A 21n which corresponds to the set (n)th bit of the set register 700 and which determines a reset timing of the output pulse signal PULSE OUTPUT "n". Thereafter, the content of the set register 700 is rightward shifted.

Here, assuming that the internal count clock has a frequency "$\phi$", a relation of $T_0=W_0/\phi$ holds.

In response to a write signal for the compare register A 21n, the flipflop 226 is reset so that the output of the NAND gate 72n is brought to the high level "1" and therefore, the AND gate 73n is opened. Accordingly, the flipflop 24n is allowed to be reset by the equal signal 23n when the equal signal 23n is generated.

In this condition, the free-running counter 201 continues to count up in response to each internal clock $\phi$, and when the count value of the free-running counter 210 reaches the value $(D_0+W_0)$, the compare register A 23n outputs the equal signal 23n. The flipflop 24n is reset by this equal signal 23n, so that the pulse output signal PULSE OUTPUT "n" is brought into the low level "0". If the equal signal 23n is not generated, the pulse output signal PULSE OUTPUT "n" continues to be maintained at the high level "1".

Next, the content of the set register 700 is shifted rightward, and "0" is written to the (n)th bit of the set register 700. Namely, a condition in which the (n−1)th bit of the set register is set is established. On the other hand, the event counter 223 continues to count up in response to each external clock. When the count value of the event counter 223 becomes equal to the value set in the compare register B 224, again, the equal signal 225 is generated by the compare register B 224, again, so that the flipflop 24n is set so as to bring the pulse output signal PULSE OUTPUT "n−1" to the high level "1". At the same time, the flipflop 226 is set, again.

On the other hand, since the (n)th bit of the set register 700 has already become "0", the output of the NAND gate 72n is "1" regardless of the status of the flipflop 226. Therefore, the AND gate 73n is open. At this time, accordingly, if the pulse output signal PULSE OUTPUT "n" continues to be maintained at the high level "1", and if the equal signal 23n is generated by the compare register A 21n, the flipflop 24n is reset so as to bring the pulse output signal PULSE OUTPUT "n" into the low level "0".

An operation for the pulse output signal PULSE OUTPUT "n−1" is the same as the case of the pulse output signal PULSE OUTPUT "n", and therefore, explanation of the operation for the pulse output signal PULSE OUTPUT "n−1" will be omitted.

Thus, the above mentioned operation is repeated, so that at each time that the equal signal 225 is generated by the compare register B 224, the pulse output signal PULSE OUTPUT corresponding to the set bit of the set register 700 is sequentially set to the high level "1". If a timing for resetting the pulse output signal PULSE OUTPUT of the high level "1" is not set by the writing signal for the corresponding compare register, the pulse output signal PULSE OUTPUT is not reset. Therefore, if the generation period of the equal signal 225 is longer than the desired output pulse width $T_0$, an operation similar to the operation of the embodiment is sequentially performed for a plurality of pulse output signals PULSE OUTPUT, so that a sequential pulse output can be obtained.

If the generation period of the equal signal 225 becomes shorter than the desired output pulse width $T_0$, the circuit operates as follows: When the equal signal 225 is generated, if the (n)th bit of the set register 700 has been set and the pulse output signal PULSE OUTPUT "n" has been at the high level "1", the flipflop 226 is set by the equal signal 225 and the output of the NAND gate 72n is brought to the low level "0". Therefore, unless the compare register A 21n is updated in the interrupt processing executed in response to the next equal signal 225, with the result that the flipflop 226 is reset, the pulse output signal PULSE OUTPUT "n" is maintained at the high level "1" (See EXAMPLE 2 in FIG. 7).

On the other hand, when the equal signal 225 is generated, if the (n)th bit of the set register 700 has been reset, the output of the NAND gate 72n has been unconditionally brought to the high level "1" so that the AND gate 73n is open. Accordingly, even if the flipflop 226 is set by the equal signal 225, after the desired period of the high level "1" is ensured and when the equal signal 23n is generated by the compare register A 21n, the flipflop 24n is reset so as to bring the pulse output signal PULSE OUTPUT "n" into the low level "1" (See EXAMPLE 1 and EXAMPLE 2 in FIG. 7).

As seen from the above, in the case of the sequential pulse output, regardless of whether the generation period of the equal signal 225 is longer or shorter than the desired output pulse width, when the equal signal 225 is generated, the pulse output signal PULSE OUTPUT corresponding to the set bit of the set register 700 is brought to the high level "1", and is maintained at the high level "1" unless a timing for reselling the high level pulse output signal PULSE OUTPUT is set in the corresponding compare register at each time that the equal signal is generated. In addition, after the timing for resetting the high level pulse output signal PULSE OUTPUT is set in the corresponding compare register, even if the equal signal 225 is generated in the condition in which the set bit of the set register 700 has already been reset as the result of the shift of the content of the set register 700, the high level pulse output signal PULSE OUTPUT continues to be maintained at the high level without being influenced by the equal signal 225. After the desired high level period has elapsed, the high level pulse output signal PULSE OUTPUT is reset to the low level "0". Therefore, a high precision sequential pulse control can be performed for a plurality of pulse output signals.

The invention has thus been shown and described with reference to the specific embodiments. However, it should be noted that the present invention is in no way limited to the details of the illustrated structures but changes and modifications may be made within the scope of the appended claims.

We claim:

1. A data processor including:
    a central processing unit, an interrupt controller for asynchronously outputting an interrupt request to the central processing unit, and a peripheral device, said central processing unit, said interrupt controller and said peripheral device being coupled to each other through a bus, said peripheral device including:

an event counter receiving an external clock for counting said external clock and for generating a first count value, a first compare register coupled to said event counter for generating a first equal signal when said first count value of said event counter becomes equal to a first value set in said first compare register, said first equal signal being supplied to said event counter so as to clear said event counter, a free-running counter receiving an internal clock for counting said internal clock and for generating a second count value, a second compare register coupled to said free-running counter for generating a second equal signal when said second count value of said free-running counter becomes equal to a second value set in said second compare register, a first flipflop set by said first equal signal and reset by a write signal for said second compare register, said write signal being programmably generated by said central processing unit, and a second flipflop set by said first equal signal, and reset by a logical product signal of an inverted signal of an output of said first flipflop and said second equal signal, such that said second flipflop generates an external pulse signal, so that even if said second equal signal is generated, the external pulse signal is never reset unless said first flipflop has been reset, wherein said first flipflop inhibits setting of said second flipflop such that said first flipflop inhibits resetting of the external pulse signal during a period between a time of setting of the external pulse signal and a time of updating of the second compare register for determining the resetting timing of the external pulse signal.

2. A data processor claimed in claim 1 wherein said peripheral device includes:

a plurality of second compare registers each coupled to said free-running counter for generating said second equal signal when said second count value of said free-running counter becomes equal to said second value set in said second compare register, and a plurality of first flipflops all set by said first equal signal and each reset by a write signal programmably generated by the central processing unit for a corresponding second compare register, a plurality of second flipflops all set by said first equal signal, and a plurality of gates each receiving the second equal signal generated by said corresponding second compare register and an output of a corresponding first flipflop and each having an output connected to a reset input of a corresponding second flipflop.

3. A data processor claimed in claim 1 wherein said peripheral device includes:

a plurality of second compare registers each coupled to said free-running counter for generating said second equal signal when said second count value of said free-running counter becomes equal to said second value set in said second compare register, a plurality of second flipflops, selection means for designating at least one flipflop of said second flipflops, first gate means, coupled to said selection means and for receiving said first equal signal, for setting only said at least one flipflop of said second flipflops designated by said selection means.

4. A data processor claimed in claim 3 wherein said peripheral device further includes:

second gate means, coupled to said selection means and for receiving the output of said first flipflop, for generating a reset inhibit signal for said at least one flipflop of said second flipflops designated by said selection means, and a plurality of gates each receiving the second equal signal generated by a corresponding second compare register and having an output connected to a reset input of a corresponding second flipflop, each of said plurality of gates being controlled by said second gate means so as to inhibit the second equal signal generated by said corresponding second compare register from being supplied to said reset input of said corresponding second flipflop.

5. A pulse generator adapted for use with a central processing unit, including:

an event counter receiving an external clock for counting said external clock and for generating a first count value, a first compare register coupled to said event counter for generating a first equal signal when said first count value of said event counter becomes equal to a first value set in said first compare register, said first equal signal being supplied to said event counter so as to clear said event counter, a free-running counter receiving an internal clock for counting said internal clock and for generating a second count value, a second compare register coupled to said free-running counter for generating a second equal signal when said second count value of said free-running counter becomes equal to a second value set in said second compare register, a first flipflop set by said first equal signal and reset by a write signal for said second compare register, said write signal being programmably generated by the central processing unit, a second flipflop set by said first equal signal, and reset by a logical product signal of an inverted signal of an output of first flipflop and said second equal signal, such that said second flipflop generates an external pulse signal, so that even if said second equal signal is generated, the external pulse signal is never reset unless said first flipflop has been reset, wherein said first flipflop inhibits setting of said second flipflop such that said first flipflop inhibits resetting of the external pulse signal during a period between a time of setting of the external pulse signal and a time of updating of the second compare register for determining the resetting timing of the external pulse signal.

6. A pulse generator claimed in claim 5 further including:

a plurality of second compare registers each coupled to said free-running counter for generating said second equal signal when said second count value of said free-running counter becomes equal to said second value set in said second compare register, and a plurality of first flipflops all set by said first equal signal and each reset by a write signal programmably generated by the central processing unit for a corresponding second compare register, a plurality of second flipflops all set by said first equal signal, and a plurality of gates each receiving the second equal signal generated by said corresponding second compare register and an output of a corresponding first flipflop and each having an output connected to a reset input of a corresponding second flipflop.

7. A pulse generator claimed in claim 5 further including:

a plurality of second compare registers each coupled to said free-running counter for generating said second equal signal when said second count value of said free-running counter becomes equal to said second value set in said second compare register, a plurality of second flipflops, selection means for designating at least one flipflop of said second flipflops, first gate means, coupled to said selection means and for receiving said first equal signal, for setting only said at least one flipflop of said second flipflops designated by said selection means.

8. A pulse generator claimed in claim 7 further including:

second gate means, coupled to said selection means and for receiving the output of said first flipflop, for generating a reset inhibit signal for said at least one flipflop of said second flipflops designated by said selection means, and a plurality of gates each receiving the second equal signal generated by a corresponding second compare register and having an output connected to a reset input of a corresponding second flipflop, each of said plurality of gates being controlled by said second gate means so as to inhibit the second equal signal generated by said corresponding second compare register from being supplied to said reset input of said corresponding second flipflop.

* * * * *